US010207134B2

(12) United States Patent
Alexander et al.

(10) Patent No.: US 10,207,134 B2
(45) Date of Patent: Feb. 19, 2019

(54) SYSTEM AND METHOD FOR TESTING A FIRE SUPPRESSION SYSTEM (71) Applicant: LUND FIRE PRODUCTS CO. INC, Bayside, NY (US)

(72) Inventors: Richard F. Alexander, Manhasset, NY (US); Ian R. Alexander, East Northport, NY (US); Lawrence I. Karp, Seaford, NY (US)

(73) Assignee: LUND FIRE PRODUCTS CO. INC., Bayside, NY (US)

( * ) Notice: Subject to any disclaimer, the term of this patent is extended or adjusted under 35 U.S.C. 154(b) by 342 days.

(21) Appl. No.: 14/479,261

(22) Filed: Sep. 5, 2014

(65) Prior Publication Data

US 2016/0067535 A1 Mar. 10, 2016

(51) Int. Cl.
*A62C 37/50* (2006.01)
*A62C 35/60* (2006.01)
(Continued)

(52) U.S. Cl.
CPC .............. *A62C 37/50* (2013.01); *A62C 35/60* (2013.01); *G01F 1/34* (2013.01); *G01F 15/001* (2013.01)

(58) Field of Classification Search
CPC ................................ A62C 35/60; A62C 37/50
See application file for complete search history.

(56) References Cited

U.S. PATENT DOCUMENTS 2,277,873 A * 3/1942 Rider ................... A62C 35/023
169/9

4,905,765 A * 3/1990 Hein ....................... A62C 37/50
169/19

(Continued)

FOREIGN PATENT DOCUMENTS

| AU | 2009100249 A4 | 4/2009 |
| GB | 2 280 369 A | 2/1995 |
| WO | 2014/133386 A2 | 9/2014 |

OTHER PUBLICATIONS

Notification of Transmittal of the International Search Report and The Written Opinion of the International Searching Authority with International Search Report and Written Opinion of the International Searching Authority of PCT/US15/48725, dated Mar. 2, 2016.

*Primary Examiner* — Lisa Caputo
*Assistant Examiner* — Alex Devito
(74) *Attorney, Agent, or Firm* — Collard & Roe, P.C.

(57) ABSTRACT

At least one embodiment comprises a testing system for a fire suppression system which can comprise at least one fluid conduit having a first end and a second end with an isolating valve and at least one pressure regulating valve coupled to the conduit. A tap is coupled to the fluid conduit, and is positioned between the first end and the second end and be for selectively allowing fluid to flow out from the fluid conduit to allow fluid to flow past the pressure regulating valve. The process for testing a fire suppression system can comprise the following steps: connecting at least one first valve to a fluid conduit, disconnecting sprinkler heads from the fluid conduit, flowing water through the pressure regulating valve determining the flow rate through the pressure regulating valve, and determining the pressure downstream of the pressure regulating valve, stopping testing, and then reporting the results.

15 Claims, 9 Drawing Sheets

(51) Int. Cl.
*G01F 1/34* (2006.01)
*G01F 15/00* (2006.01)

(56) References Cited

U.S. PATENT DOCUMENTS

| | | |
|---|---|---|
| 2003/0154763 A1 | 8/2003 | Cain |
| 2006/0028323 A1* | 2/2006 | Ohno .................. G08G 1/0962 340/425.5 |
| 2006/0272829 A1* | 12/2006 | Larsen .................. E21B 33/037 166/387 |
| 2008/0116149 A1* | 5/2008 | Dick ......................... C02F 1/78 210/760 |
| 2009/0188567 A1 | 7/2009 | McHugh |
| 2012/0298381 A1 | 11/2012 | Taylor |
| 2016/0001113 A1 | 1/2016 | Buitenhuis |

* cited by examiner

SYSTEM AND METHOD FOR TESTING A FIRE SUPPRESSION SYSTEM

BACKGROUND

At least one embodiment of the invention relates to a system and method for testing a fire suppression system. The system and method can comprise at least one controller and/or computer which isolates at least one component of a fire suppression system such as a valve. In at least one embodiment, the valve can be in the form of a pressure regulating valve (PRV) which can be tested by flowing water through the valve. The system and method can then log the results and determine whether the valve passed the test.

Pressure regulating valves can form an important part of a fire suppression system. Pressure regulating valves for fire protection applications are designed for use in fire protection systems to provide protection against excessive water pressure caused by thermal expansion or line surge. For example, in at least one embodiment, each floor of a building can contain a pressure relief valve disposed along the sprinkler system positioned before or upstream of the sprinkler heads on each floor of the sprinkler system. With this design, the pressure relief valve prevents excessive pressure from reaching the sprinkler heads which could cause the sprinkler heads to release fluid prematurely or cause poor water spray patterns. For example, in at least one embodiment, the pressure in a fluid conduit upstream of a pressure regulating valve can be between 225 and 175 psi. However, after the fluid passes the pressure regulating valve (PRV) the fluid pressure can drop to below 175 psi to prevent improper water distribution at the sprinkler heads of a sprinkler system.

Other fire suppression systems are known such as U.S. Patent Application publication No. 2012/0298381 to Taylor the disclosure of which is hereby incorporated herein by reference. Therefore, there is a need for a system to test fire suppression systems in an efficient manner.

SUMMARY

At least one embodiment comprises a testing system for a fire suppression system which can comprise at least one fluid conduit having a first end and a second end. The system can have an isolating valve and at least one pressure regulating valve coupled to the conduit. A tap or three-way valve is coupled to the fluid conduit, and is positioned between the first end and the second end and be for selectively allowing fluid to flow out from the fluid conduit to allow fluid to flow past or through the pressure regulating valve. This system then allows for the testing of the pressure regulating valve without having to remove the pressure regulating valve from the system.

In at least one embodiment there is a process for testing a fire suppression system which can comprise the following steps: connecting at least one first valve to a fluid conduit, disconnecting sprinkler heads from the fluid conduit, flowing water through the pressure regulating valve determining the flow rate through the pressure regulating valve, and determining the pressure downstream of the pressure regulating valve, stopping testing, and then reporting the results.

This process can be used to test a pressure regulating valve without having to remove a pressure regulating valve from a fire suppression system.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION

Figure 1:
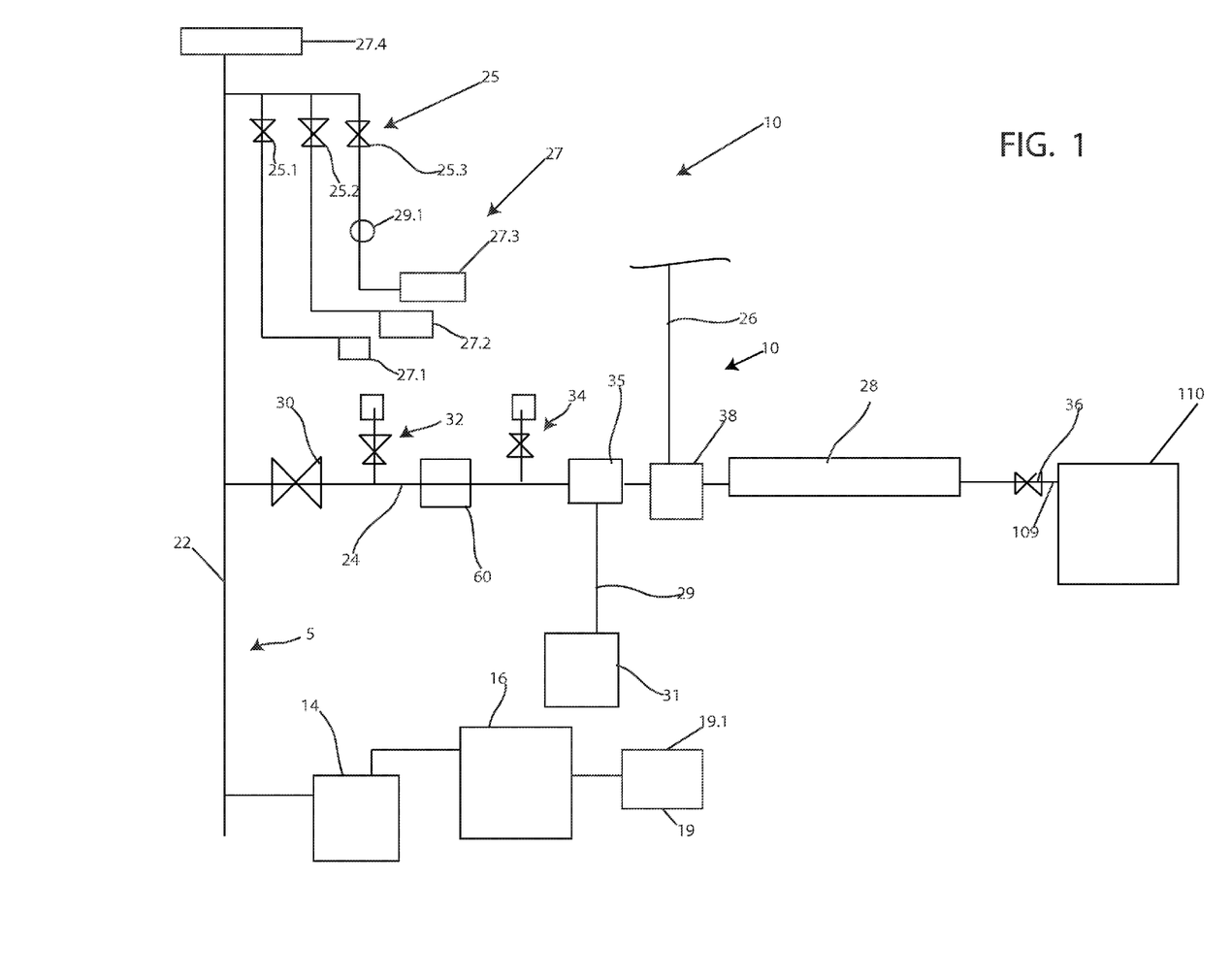
FIG. 1 is a schematic block diagram of a fire suppression system having testing system coupled thereto.

FIG. 1 is a schematic block diagram of a fire suppression system 5 having testing system 10 coupled thereto. For example, the fire suppression system 5 comprises a fluid conduit which comprises a riser 22 coupled at a first end to a fire pump 14 and a fire pump controller 16. The fluid conduit can be in the form of any suitable fluid conduit known in the art such as pipes. The fire pump controller 16 controls the fire pump 14 to pressurize the fluid in the fluid conduit such as the riser 22. In at least one embodiment, the fluid comprises water taken from a water main providing municipal water. In at least one additional embodiment, the fluid can comprise some form of water mixed with additional fire suppression fluids. Water can also be supplied from a pressurized tank or gravity water tank.

The fire pump controller 16 can function as a central controller or be connected to or in communication with a central controller or computer 19. If a central controller is used such as computer 19 it can be in the form of a computer such as a typical Intel based personal computer running any one of a Linux, Apple, or Windows based operating system. Computer 19 can be wirelessly coupled to the other control devices or coupled to the other control devices through a wired connection 19.1 such as an Ethernet connection.

Figure 2A:
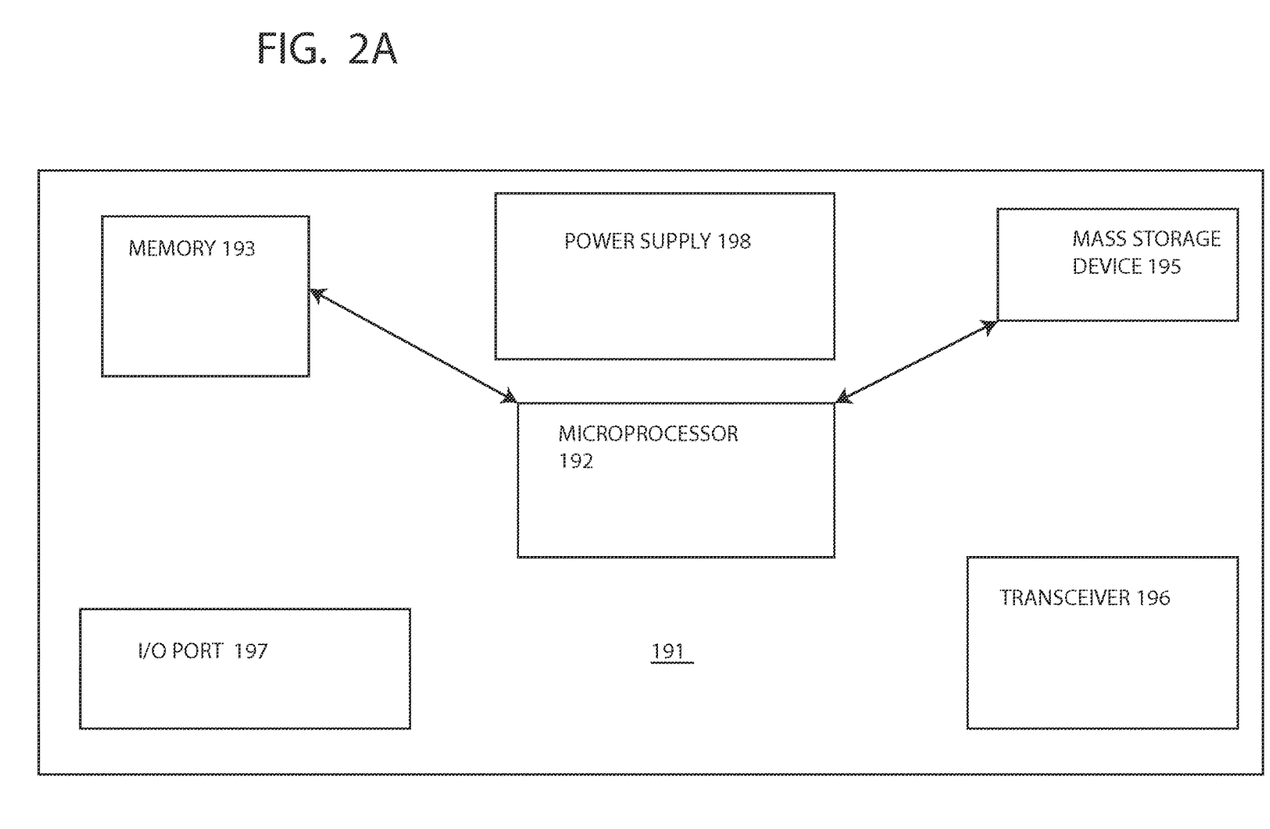
FIG. 2A is a schematic block diagram of a computer that can be used with the system.

FIG. 2A shows the design of the computer 19 which includes a motherboard 191, a microprocessor 192, a memory 193 such as a flash or EEPROM memory or any other suitable memory known in the art, a mass storage device 195 such as a hard drive or flash drive, a transceiver or communications port 196, at least one input/output port 197 such as an input port for a keyboard, mouse or screen, and a power supply for providing power supply to the motherboard and to the components. These components are coupled together both electrically and communicatively on the motherboard 191 and can all communicate between each other so that the microprocessor can perform at least some of the steps outlined in FIG. 6

Figure 2B:
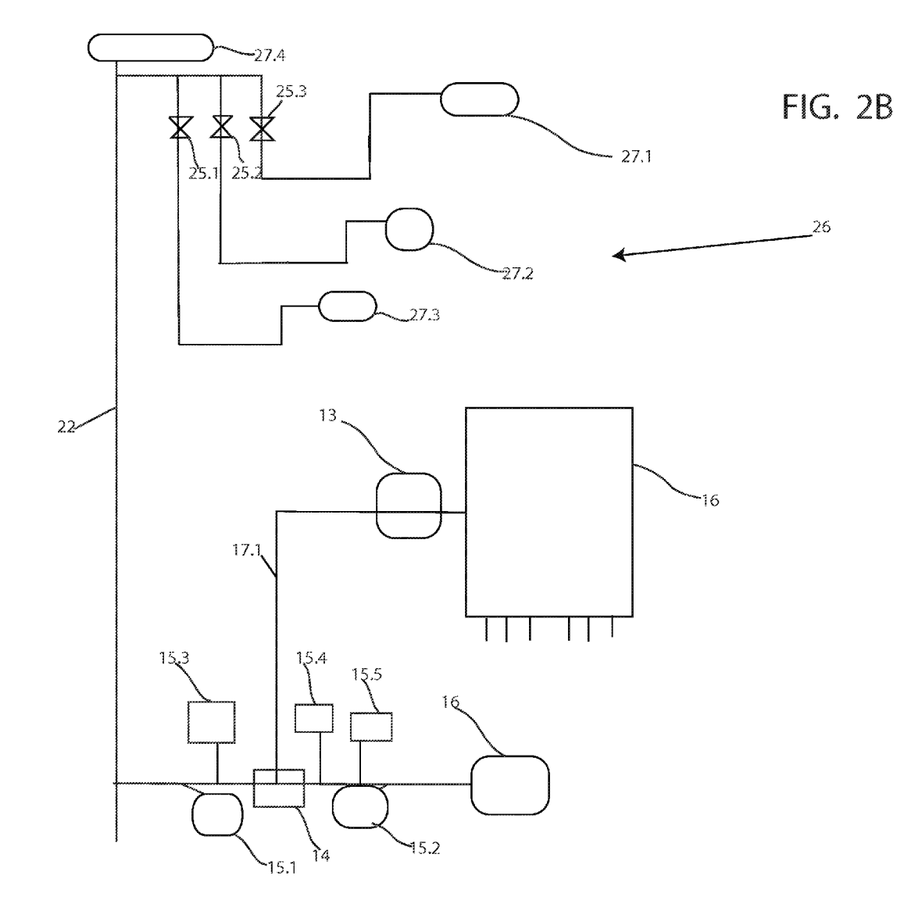
FIG. 2B is a schematic block diagram of the beginning and end regions of the fire suppression system.

As shown in FIG. 2B fire pump controller 16 is coupled to fire pump 14 via a communication line 17.1. Alternatively, fire pump controller 16 can be coupled wirelessly to command fire pump 14. A sensor 13 is disposed adjacent to fire pump controller 16 to determine the heat generated by the fire pump controller power source. In addition, a heat sensor such as sensors 15.1 and 15.2 can be placed adjacent to fire pump 14 to determine the heat generated by the fire pump. Alternate sensors such as a pressure sensor 15.3, a tachometer 15.4, or another pressure sensor 15.5 can also be coupled along this line. This information can be fed in a wired manner or wireless manner to the computer 19.

As shown in both FIGS. 1 and 2B, at the opposite end of the fire pump 14 are a series of valves 25, including valves 25.1, 25.2, 25.3, and corresponding pressure sensors 27, including pressure sensors 27.1, 27.2, 27.3, and 27.4. Each of these lines can also include a corresponding flow meter 29.1 which is used to selectively drain fluid from the fluid conduit.

Figure 3:
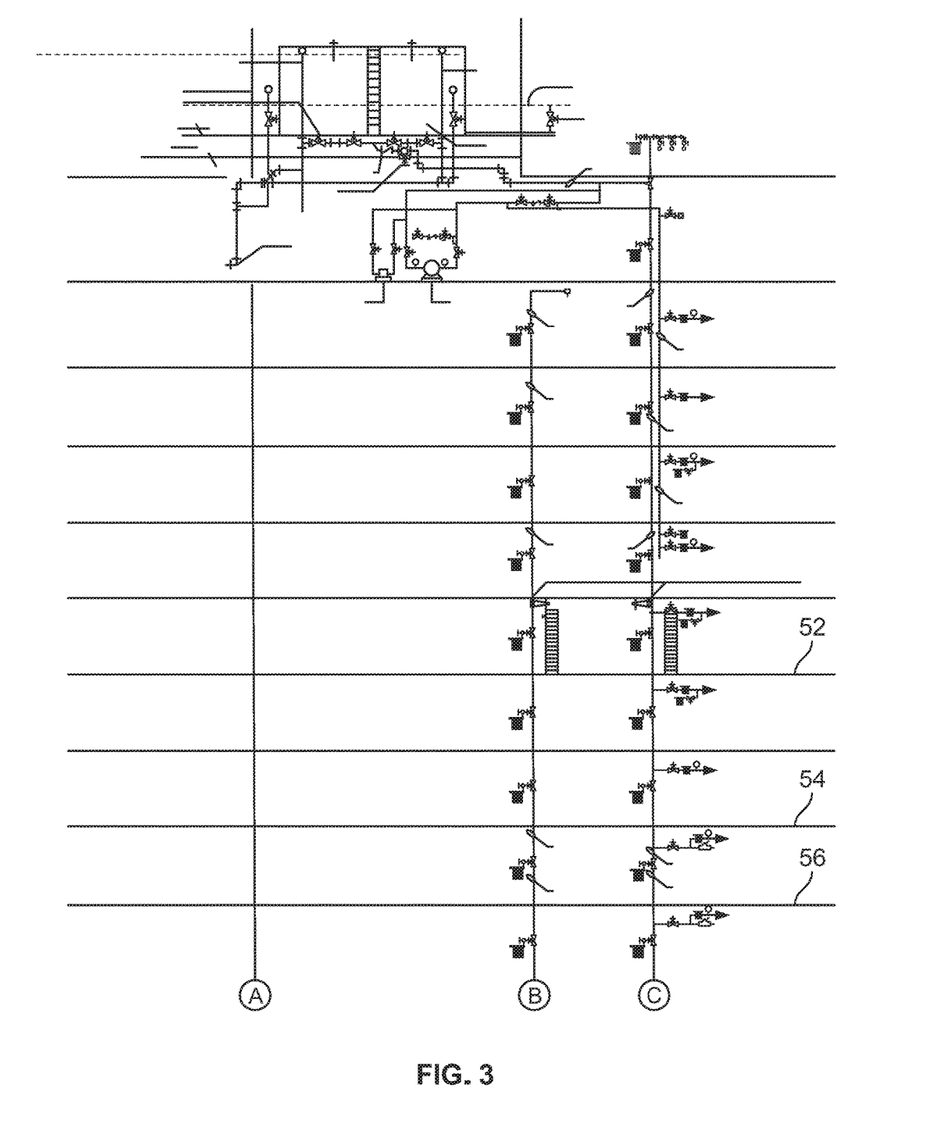
FIG. 3 shows a schematic block diagram of an example of a fire suppression system in a building.

Coupled between the two ends of the fluid conduit intermediate connections forming at least one line 24. Lines such as supply line 24 forms a conduit or service line for a floor such as any one of service lines 52, 54, 56 and 58 shown in FIG. 3.

Figure 4:
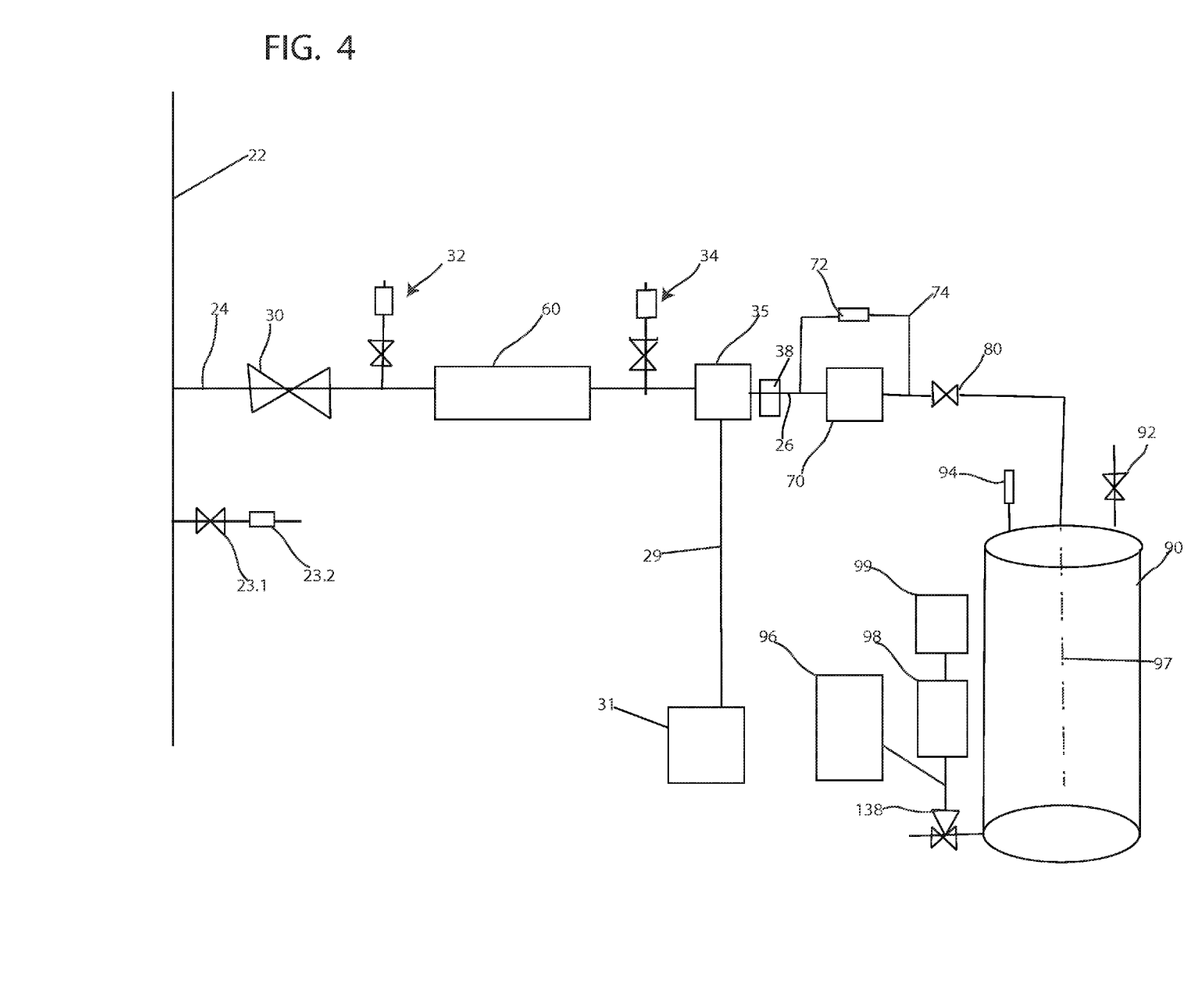
FIG. 4 is a schematic block diagram of a testing system for a fire suppression system for use with the embodiment shown in FIG. 1.

As shown in both FIGS. 1 and 4 there is at least one isolating valve 30 disposed along supply line 24 to isolate the riser line 22 from the individual supply line 24.

Coupled to, and disposed along supply line 24 is the pressure regulating valve 60. Coupled to either side of pressure regulating valve 60 are pressure sensors 32 and 34. Pressure sensor 32 is disposed upstream from pressure regulating valve 60. Pressure sensor 34 is disposed downstream from pressure regulating valve 60. Sensors 32 and 34 are configured to be either in wireless communication with computer 19 or in wired communication with this computer. Coupled to supply or service line 24, downstream from sensor 34, is a valve 35 which is coupled to drain line 29 for selectively draining fluid from the supply line 24 into drain 31. In addition, coupled to supply line 24 is a test valve which in at least one embodiment is a three way valve 38 which feeds into test line 26, or selectively flows onto sprinkler supply line 28. Coupled along sprinkler supply line 28 are sprinkler heads which can be used to suppress a fire in the event of a rise in temperature or a detection of heat. There is also an additional isolating valve 36 which is coupled to a line 109 (See FIGS. 1 and 5) which feeds into optional occlusion or obstruction testing container or barrel 110. Line 109 is coupled to sprinkler line 28.

FIG. 4 shows a modification of the embodiment shown in FIG. 1 wherein this view shows the addition of the testing equipment to test whether the PRV valve 60 is functioning properly. Coupled to riser line 22 is a valve 23.1 and a riser pressure sensor 23.2.

As shown in FIG. 4, line 26 is coupled to three-way valve 38. Three-way valve 38 is coupled to line 26 and to line 24. Downstream of three-way valve 38 and coupled along testing line 26 is a flow meter 70. Coupled in parallel to flow meter 70 is a differential pressure sensor 72 which is coupled along parallel line 74. Both these lines 26 and 74 feed into automated control valve 80. Automated control valve 80 can be coupled in a wired or wireless manner to a controller such as fire pump controller 16 or computer 19 which can automatically open control valve 80 in the event of a test. In addition, flow meter 70 and pressure sensor 72 are also in communication with the computer 19 as well sending values to computer 19 in the event of a test.

In the event of a test, a suitable controller opens control valve 80 and causes fluid to flow into container 90. Automated control valve 80 can also be opened to simulate flow.

Container 90 is coupled along line 26 and comprises a portable tank that can be moved from floor to floor and selectively coupled to a select service line such as supply line 24. Under normal operating conditions, a simple three-way valve or test outlet 38 is connected to the line. When a user needs to test the line on a periodic basis, such as every year or every five years, the user can tap into the three-way valve 38, isolate the sprinklers from the line, and instead send the fluid into a container such as container 90. As fluid is flowing into the container during the test, the system can then determine whether the PRV valve 60 is working by reading the values of the differential pressure sensor 72 and the flow meter 70 during the test.

Container 90 can be selectively depressurized and/or pressurized so that it can first receive fluid and then selectively expel fluid. Coupled to tank 90 is a vent 92 and a tank pressure sensor 94. In addition, to selectively pressurize tank 90 there can be a pressurizer which can comprise any one of an air cylinder 96 with a regulator, or an air compressor 98, having a pump 99. The tank is coupled to this pressurizer via a test valve or in at least one embodiment a three-way valve 138 which selectively opens to allow pressurizing fluid such as air to enter the tank to forcibly expel the fluid that is already inside such as water. Tank or container 90 can either be a pressurized tank or a gravity feed tank which creates pressure in a line through a gravity feed. In the case of a gravity feed tank, the positioning of the tank can be set so as to allow flow of fluid into the system or pressurized to force fluid out of the system.

Tank or container 90 is used because it serves as a set volume to receive pressurized fluid over time. By using the flow meter and the differential pressure sensor over a preset period of time, and by measuring the time to fill the tank, the controller such as fire pump controller 16 or computer 19 can determine whether the pressure regulating valve is operating properly.

Tank or container 90 can also contain a siphon tube 97 which allows the fluid under pressure to be distributed out of the container via a three-way valve 38. Thus, as the water is under pressure, the water naturally flows up the siphon tube 97 along line 26 and out of the system past three way valve 38, into valve 35, and then through the drain 29.

Once the testing and evaluation is performed, the tank can be drained of its fluid by pressurizing the tank via the air compressor, or air cylinder to forcibly expel the water inside the tank through drain line 29.

Each service line, or alternatively, the entire system can also be automatically or selectively tested for particles such as occlusions, obstructions or impediments.

Thus, as shown in FIG. 1 the service line 28 feeds into a valve 36 which serves as a connecting valve to an obstruction barrel 110.

Figure 5:
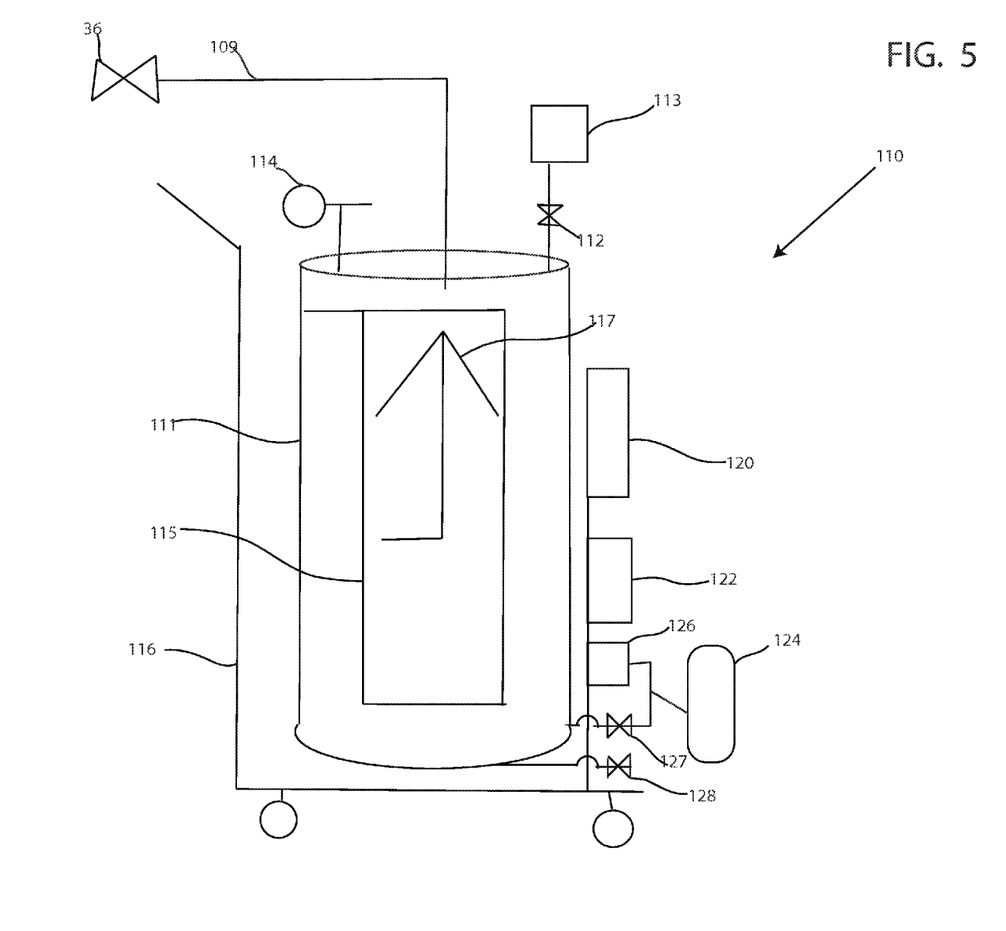
FIG. 5 is a schematic block diagram of another embodiment of a testing system for use with the embodiment of FIG. 1.

As shown in FIG. 5, valve 36 is coupled to line 109 which feeds into obstruction barrel 110. Obstruction barrel 110 comprises a barrel body 111, having a pressure gauge 114 coupled to it, as well as a vent 112 coupled to it as well. When fluid flows inside of the barrel, air is vented out via vent 112. The fluid flows into deflection screen 117 disposed inside of the barrel and adjacent to screen 115. The fluid splashes off of deflection screen 117 formed as a cone hitting filter screen 115 and thereby trapping any obstructions inside of this inner screen for examination. Filter screen 115 is formed around deflection screen to trap the material that flows off of deflection screen 117.

The entire barrel can be made portable by mounting it on a mobile cart 116. In addition, coupled to the barrel are a plurality of valves 127, 128 as well as an air compressor 122, an air cylinder with a regulator 124, or a pump 126 to selectively pump material out of the barrel. An air hose reel 120 can be coupled to the side of the barrel and be used to couple to either the cylinder 124, the compressor 122, or the pump 126.

Figure 6:
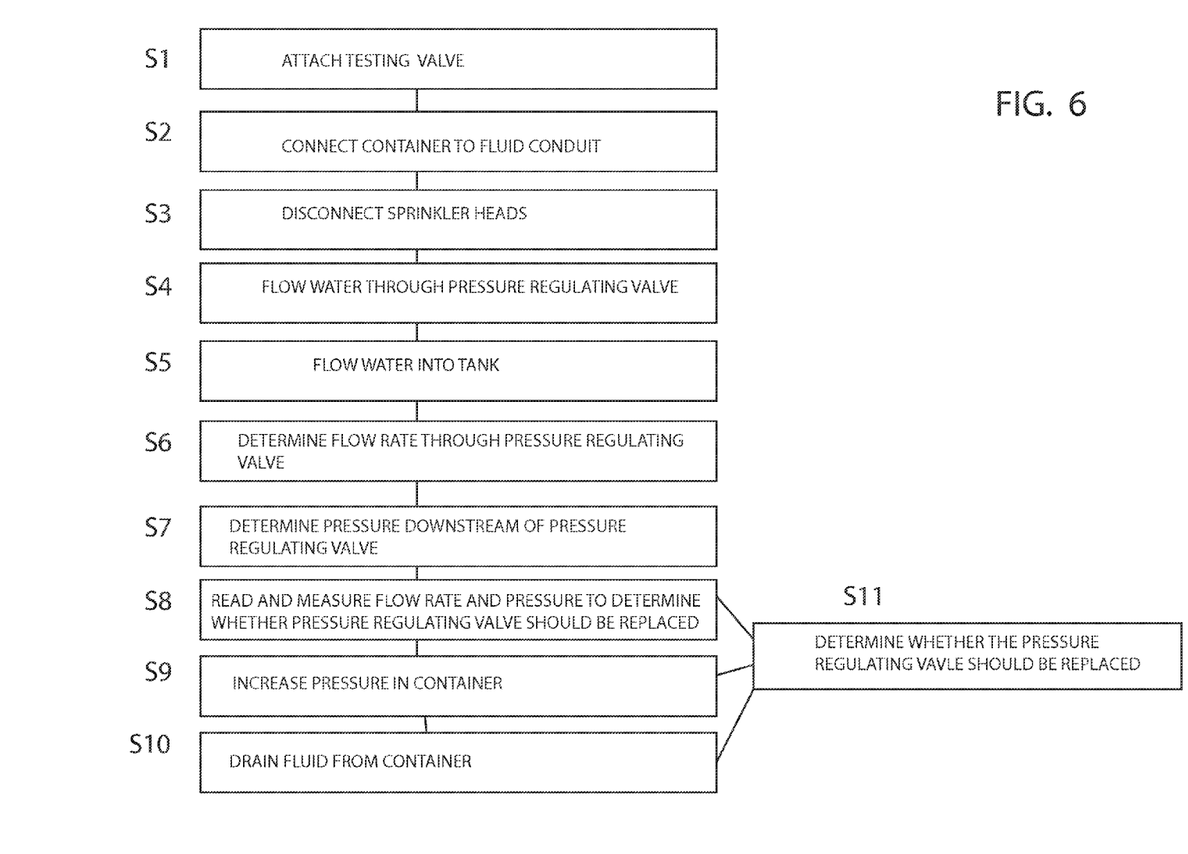
FIG. 6 is a flow chart of a first embodiment of the process for testing the fire suppression system.

FIG. 6 is a flow chart of a first embodiment of the process for testing the fire suppression system. For example, the process starts in step s1 where a user connects a three-way valve to a service line such as to service line 24. Next, in step S2, a container such as container 90 is coupled to a fluid conduit such as conduit 26. Next, in step S3, the three-way valve is operated to isolate the sprinkler heads from the rest of the system. Vent valve 112 can also have a filter added if needed.

Next, in step S4, water flows through the pressure regulating valve such as valve 60. This occurs in step S5, where automated control valve 80 opens, and water flows into tank 90.

Next, in step S6 the system determines the flow rate through PRV valve 60. This step can be determined by determining the volume of fluid that flows, the time that the fluid flows, obtaining readings from the flow meter 70, as well as from the differential pressure sensor 72 to determine whether fluid is flowing at a proper rate and at a proper pressure through pressure regulating valve 60. In addition the system determines the pressure differential in step S7.

Thus, in step S7, the pressure from pressure sensor 32, as well as pressure sensor 34 is read by the controller such as controller 16 or computer 19 to determine the ability of pressure regulating valve 60 to regulate the pressure inside of service line 24. In addition, to provide an additional point of reference the pressure from riser pressure sensor 23.2 can also be read by controller 16 or computer 19 as well.

Thus, in step S8 the controller reads and measures the flow rate and pressure changes once the water flows through the pressure regulating valve 60. Next, either before step S11 or after, the system such as computer 19 can increase the pressure inside of container 90 to send fluid outside of container 90 to drain container 90 in step S10. As indicated above, the steps in this process that are performed by computer 19 are performed by the microprocessor which reads instructions fed from the mass storage device into the memory and then into the associated microprocessor such as microprocessor 192.

Step S11 involves the measurement of the flow meter 70 and the differential pressure sensor 72 to determine whether the PRV valve meets the flow criteria set by the manufacturer of the PRV valve. For example, this flow criteria can be in the form of an acceptable range of preset values such as a low to high range in flow rate. Another value that can be set as criteria, either alternatively or in addition to the flow rate is a pre-set pressure range based upon an acceptable low pressure level or high pressure level. These criteria can be stored in the mass storage device 195, in the memory 193 and evaluated using microprocessor 192.

If the PRV valve meets the preset flow criteria then the valve passes inspection. If however the PRV valve 60 does not meet the preset criteria, the computer 19 can inform the user that this valve needs to be replaced.

Ultimately, the testing system and process is used to determine as shown in step S11 whether the pressure regulating valve is operating as designed and should be replaced.

By creating an automated test for testing the pressure regulating valve, the pressure regulating valve (PRV) does not have to be removed offsite and tested in a controlled laboratory. This allows fire suppression systems such as sprinkler systems to continue to operate and be tested with less downtime and possibly less cost. Furthermore, the automated testing system can also be used to test for obstructions inside of the system to determine whether there is corrosion or breakdown inside of the fire suppression system.

Figure 7:
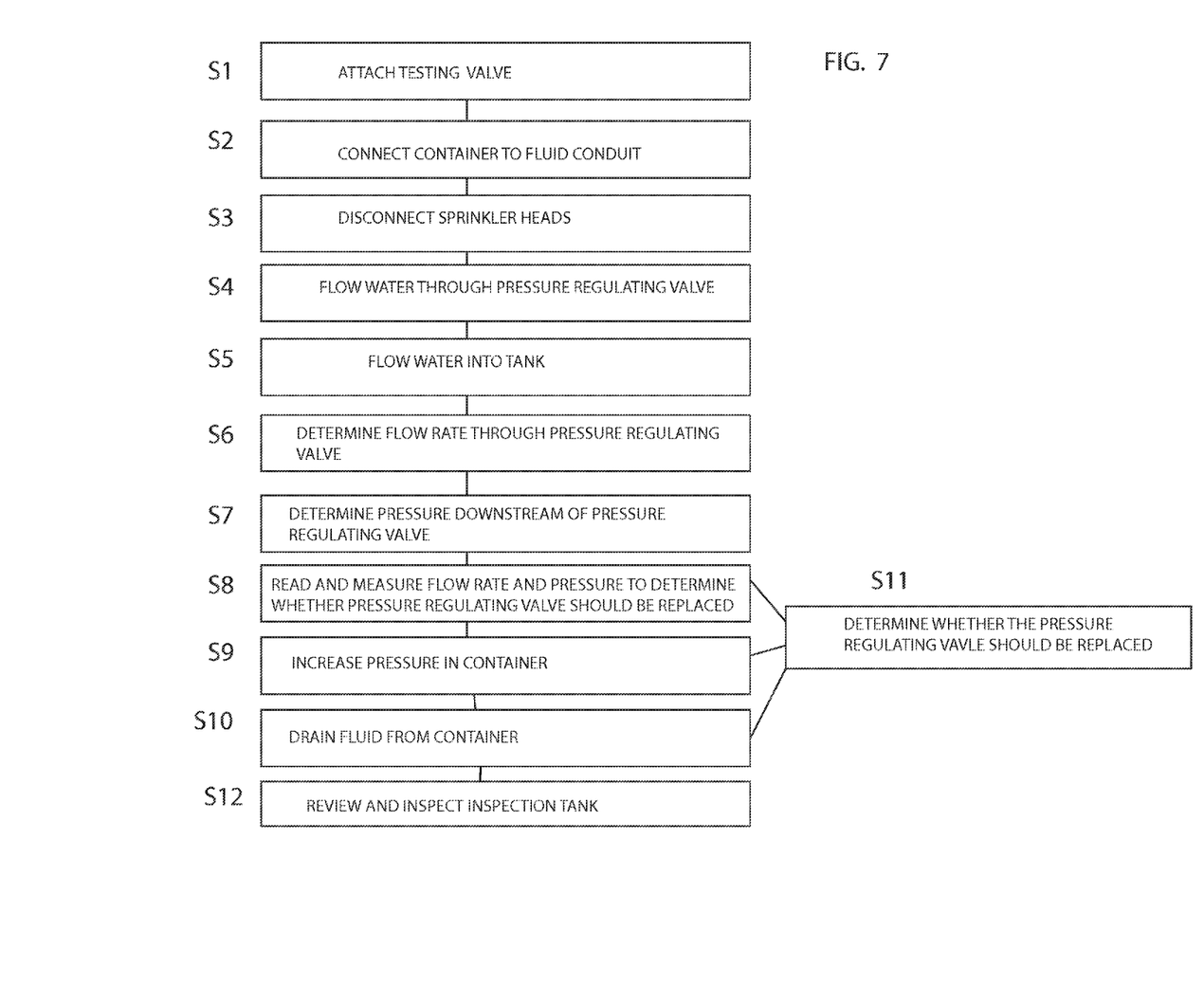
FIG. 7 is a flow chart of another embodiment of the process for testing the fire suppression system.

FIG. 7 shows another embodiment for testing. With this embodiment, there is an additional step S12, wherein the user can review and inspect the tank 110 shown in FIG. 5 for particles. With this test, the bottom valve 128 drains out fluid to leave the obstructive material. This allows a user to inspect the container 110 to determine the health of the lines. Depending on the size of the particles and the density of the particles in the wastewater, any one of the lines such as line 24 may need to be replaced. Therefore, the testing system of FIG. 4 and the additional testing system of FIG. 5 can be used to determine the health/ quality or life of a supply line for a building or for each individual floor of a building.

Accordingly, while at least one embodiment of the present invention has been shown and described, it is obvious that many changes and modifications may be made thereunto without departing from the spirit and scope of the invention.

What is claimed is:

1. A testing system for a fire suppression system comprising:
   a) at least one fluid conduit comprising a supply line having a first end and a second end wherein said at least one fluid conduit is on a single floor;
   b) at least one isolating valve coupled to said fluid conduit;
   c) at least one pressure regulating valve coupled to said conduit;
   d) a first pressure sensor coupled to said conduit and disposed upstream from said at least one pressure regulating valve, and a second pressure sensor coupled to said conduit and disposed downstream from said at least one pressure regulating valve;
   e) at least one three-way valve comprising a tap coupled to said fluid conduit, and positioned between said first end and said second end, said tap for selectively allowing fluid to flow out from said fluid conduit to allow fluid to flow past said pressure regulating valve;
   f) at least one tank having a vent, said tank coupled to said three-way valve, downstream from said pressure regulating valve, wherein said tank is configured to received fluid from said fluid conduit when said at least one pressure regulating valve is being tested and wherein said at least one tank is configured to be isolated from said sprinkler system via said three-way valve during testing of said pressure regulating valve.

2. The testing system as in claim 1, wherein said fluid conduit is a plurality of pipes.

3. The testing system as in claim 2, wherein said fluid conduit is configured to pass water along said conduit.

4. The testing system as in claim 1, wherein said at least one isolating valve comprises at least one first isolating valve and at least one second isolating valve, wherein said at least one pressure regulating valve is positioned between said at least one first isolating valve and said at least one second isolating valve.

5. The testing system as in claim 1, wherein said fluid conduit comprises a sprinkler system that comprises a fire pump and a fire pump controller a gravity tank and a pressurized tank.

6. The testing system as in claim 1, wherein said three-way valve is positioned after said pressure regulating valve (PRV) and before a first sprinkler positioned after said pressure regulating valve.

7. The testing system as in claim 1, wherein said least one container further comprises at least one tank pressure sensor.

8. The testing system as in claim 1, wherein said at least one container further comprises at least one pressurizer configured to selectively pressurize said at least one container to selectively drain fluid from said at least one container after said pressure regulating valve has been tested.

9. The testing system as in claim 8, further comprising at least one flow meter and at least one differential pressure sensor coupled in parallel along said at least one fluid conduit, said flow meter measuring a flow rate through said pressure regulating valve.

10. The testing system as in claim 8, wherein said pressurizer comprises at least one air compressor configured to pressurize said container, wherein the system further comprises at least one drain, said drain configured to drain fluid from said container when fluid is drained from said container.

11. The testing system as in claim 1, further comprising at least one occlusion container, configured to receive fluid from said at least one fluid conduit and to filter said fluid to separate particles from said fluid in said at least one occlusion container.

12. The testing system as in claim 6, wherein said three-way valve is configured to isolate said sprinklers from fluid flow when said pressure regulating valve is being tested.

13. The testing system as in claim 1, wherein said container is a portable container.

14. The testing system as in claim 1, further comprising at least one microprocessor, wherein said at least one microprocessor is in communication with the system including said at least one first pressure sensor and said at least one second pressure sensor and is configured to determine whether the pressure regulating valve meets a set of preset criteria.

15. The testing system as in claim 14, further comprising at least one flow meter and at least one differential pressure sensor coupled in parallel along said at least one fluid conduit, said flow meter measuring a flow rate through said pressure regulating valve wherein said microprocessor is in communication with said flow meter and said differential pressure sensor, and wherein said microprocessor is configured to determine whether the pressure regulating valve meets a set of preset criteria.

* * * * *